United States Patent
Detlefsen et al.

(10) Patent No.: US 7,583,221 B2
(45) Date of Patent: Sep. 1, 2009

(54) METHOD AND DEVICE FOR IMAGING TEST OBJECTS BY MEANS OF MILLIMETER WAVES, IN PARTICULAR FOR INSPECTING INDIVIDUALS FOR SUSPICIOUS OBJECTS

(75) Inventors: Juergen Detlefsen, Berg (DE); Michael Jeck, Mainz (DE)

(73) Assignee: Smiths Heimann GmbH, Wiesbaden (DE)

( * ) Notice: Subject to any disclaimer, the term of this patent is extended or adjusted under 35 U.S.C. 154(b) by 0 days.

(21) Appl. No.: 11/869,716

(22) Filed: Oct. 9, 2007

(65) Prior Publication Data

US 2008/0174476 A1 Jul. 24, 2008

Related U.S. Application Data

(63) Continuation of application No. PCT/EP2006/003169, filed on Apr. 7, 2006.

(30) Foreign Application Priority Data

Apr. 8, 2005 (DE) .................. 10 2005 016 1406

(51) Int. Cl.
*G01S 13/89* (2006.01)
*G01S 13/90* (2006.01)

(52) U.S. Cl. .................................................. 342/25 A

(58) Field of Classification Search ............ 342/25 A, 342/179, 22
See application file for complete search history.

(56) References Cited

U.S. PATENT DOCUMENTS

| 5,455,590 | A | 10/1995 | Collins et al. |
| 5,673,050 | A | 9/1997 | Moussally et al. |
| 5,859,609 | A | 1/1999 | Sheen et al. |
| 7,119,731 | B2 * | 10/2006 | Fleisher ........................ 342/22 |
| 7,123,185 | B2 * | 10/2006 | Fleisher et al. ............... 342/179 |
| 7,145,506 | B2 * | 12/2006 | Holt et al. ..................... 342/179 |

(Continued)

FOREIGN PATENT DOCUMENTS

WO    WO 9811453    3/1998

(Continued)

OTHER PUBLICATIONS

Bara M. et al., High-Speed focusing algorithm for circular synthetic aperture radar (C-SAR), Electronics Letters, IEE Stevenage, GB, vol. 36, No. 9, Apr. 27, 2007, pp. 828-830.

(Continued)

*Primary Examiner*—Dan Pihulic
(74) *Attorney, Agent, or Firm*—Muncy, Geissler, Olds & Lowe, PLLC

(57) ABSTRACT

A method for imaging test objects by millimeter waves, especially for checking individuals for suspicious objects is provided, whereby the test object is gradually irradiated with millimeter waves along its circumference and the scattered waves are received and evaluated in order to display an image of the test object. A viewing direction of the transmitting area and a direction of reception of the receiving area extend at an angle of 15° to 70°, preferably 20° to 35° to the longitudinal axis of the test object. For evaluation of the scattered waves in the direction of the longitudinal axis of the test object, a pulse radar or FMCW radar technology is used, and for evaluation at an angle to the longitudinal axis, SAR technology is used.

14 Claims, 1 Drawing Sheet

U.S. PATENT DOCUMENTS

| | | | |
|---|---|---|---|
| 7,180,441 B2 * | 2/2007 | Rowe et al. | 342/22 |
| 7,202,808 B2 * | 4/2007 | Fleisher et al. | 342/22 |
| 7,205,926 B2 * | 4/2007 | Rowe et al. | 342/22 |
| 7,265,709 B2 * | 9/2007 | Fleisher et al. | 342/22 |
| 7,386,150 B2 * | 6/2008 | Fleisher | 342/22 |
| 2005/0231415 A1 * | 10/2005 | Fleisher et al. | 342/22 |
| 2005/0231417 A1 * | 10/2005 | Fleisher et al. | 342/22 |
| 2005/0231421 A1 * | 10/2005 | Fleisher et al. | 342/179 |
| 2006/0104480 A1 * | 5/2006 | Fleisher | 382/103 |
| 2006/0164285 A1 * | 7/2006 | Fleisher | 342/22 |

FOREIGN PATENT DOCUMENTS

| | | |
|---|---|---|
| WO | WO 2006105977 A1 * | 10/2006 |

OTHER PUBLICATIONS

Dallinger A et al., Short Distance Related Security Millimeter-Wave Imaging Systems, GEMIC 2005, Proceedings of the German Microwave Conference, Apr. 5, 2005, p. 244-246.

* cited by examiner

METHOD AND DEVICE FOR IMAGING TEST OBJECTS BY MEANS OF MILLIMETER WAVES, IN PARTICULAR FOR INSPECTING INDIVIDUALS FOR SUSPICIOUS OBJECTS

This nonprovisional application is a continuation of International Application No. PCT/EP2006/003169, which was filed on Apr. 7, 2006, and which claims priority to German Patent Application No. DE 102005016106, which was filed in Germany on Apr. 8, 2005, and which are both herein incorporated by reference.

BACKGROUND OF THE INVENTION

1. Field of the Invention

The present invention relates to a method for imaging test objects by millimeter waves, in particular for inspecting individuals for suspicious objects, in which the test object is illuminated successively with millimeter waves along its circumference, and the scattered waves are received and analyzed to display an image of the test object. In addition, the invention concerns a device for carrying out the inventive method.

2. Description of the Background Art

In order to inspect individuals such as airline passengers for suspicious objects, such as weapons or explosives, metal detectors are used or the individuals are scanned by hand. Metal detectors have the disadvantage that they cannot detect any dangerous nonmetallic objects such as plastic weapons or explosives. Manual scanning is time-consuming and under certain circumstances is experienced as an invasion of privacy.

In order to eliminate these disadvantages, a variety of non-contacting monitoring systems have been proposed in which the individuals are scanned with millimeter waves in order to detect suspicious objects. U.S. Pat. No. 5,859,609 describes such a method in which the individual to be inspected stands on a platform while being successively illuminated along his circumference with millimeter waves from a vertical antenna array. To this end, the antenna array travels in a circle around the individual and scans him circumferentially. Electrical signals are produced at a variety of predetermined positions in space from the waves reflected from the target, and a computer generates a holographic reconstruction of the target from these signals. Similar methods are described in U.S. Pat. No. 5,455,590 and EP-A 0 925 517. The prior art devices for carrying out these methods require a complicated structure and are thus very expensive.

SUMMARY OF THE INVENTION

It is therefore an object of the present invention to provide a method for imaging test objects by means of millimeter waves that requires a less complicated apparatus to carry it out and that can thus be implemented in a more economical manner.

This object is attained according to the invention in that the direction of view of the transmitting antenna(s) and the direction of reception of the receiving antenna(s) are inclined at an angle of 15° to 70°, preferably 20° to 35°, to the longitudinal axis of the test object, and by the means that the pulse radar or FMCW radar principle is used to analyze radiation scattered in the direction of the longitudinal axis of the test object and the SAR principle is used for analysis perpendicular to the longitudinal axis. The longitudinal axis of the test object preferably extends vertically, and a successive illumination along the circumference takes place in the horizontal direction perpendicular to the longitudinal axis. In this regard, the illuminating device and the arrangement for scattered field sensing preferably are moved along the surface of a vertical cylinder around the test object to be imaged.

Alternatively, it is also possible to cause the test object to rotate before a stationary illuminating and receiving device. It is likewise possible, although very complex in terms of design, to activate the individual transmitting and receiving antennas of an antenna array extending around the entire circumference of the test object in an appropriately time-shifted manner.

As a result of the circumferential motion perpendicular to the longitudinal axis of the test object, every point on the surface of the object is sensed from multiple perspectives. The common analysis of these perspectives based on the SAR (synthetic aperture) principle corresponds to an antenna that is effectively much larger, resulting in an improvement in resolution perpendicular to the longitudinal axis of the object. The pulse radar or FMCW (frequency modulated continuous wave) radar principle is used for analysis in the direction of the longitudinal axis of the test object. Thus, the reflected signal corresponding to every radiated signal can be identified, and the surface structure can be reconstructed from the determination of the propagation time. Illumination diagonally from above and/or below achieves the greatest propagation time differences for adjacent points on the surface of the test object, thus improving resolution in the direction of the longitudinal axis.

Either the transmitting antennas themselves, or else separate receiving antennas, can be used to receive the reflected waves. Resolution can be improved still further if a receiving and transmitting system is used that has one transmitting antenna and two associated receiving antennas that are spaced apart from one another by a specific distance a. It is then possible to uniquely localize the point on the surface that is illuminated at that time from the known spacing a and the measured phase difference between the signals from the two receiving antennas. This method is known as interferometry.

The millimeter waves used for illumination have a frequency between 1 GHz and 10 THz. Preferably, the frequency of the millimeter waves lies between 50 GHz and 200 GHz.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein the FIGURE shows a cross-section through an inventive device.

DETAILED DESCRIPTION

Figure 1:
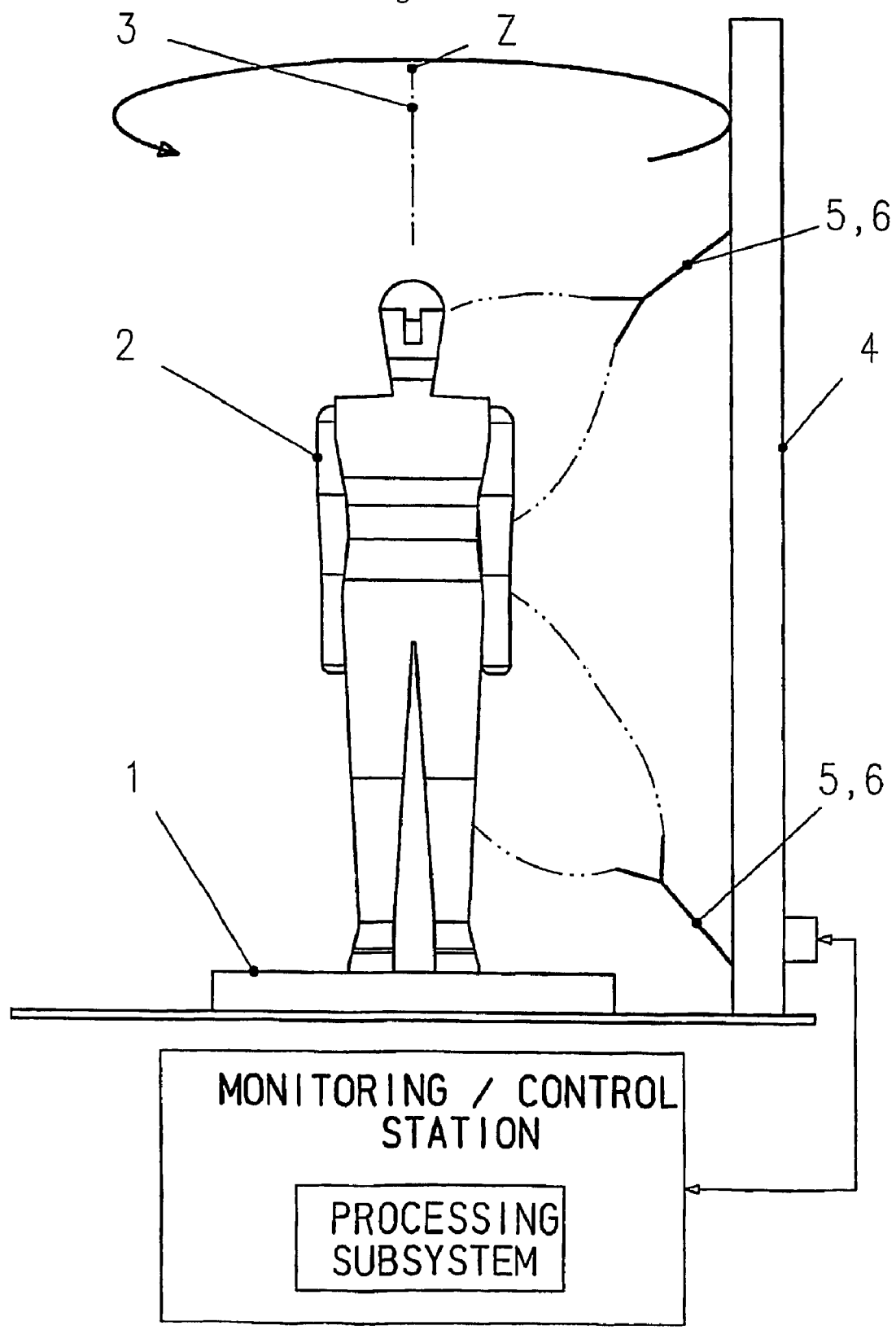

The device shown in FIG. 1 is used for inspecting airline passengers for suspicious substances such as weapons or explosives during check-in at an airport.

The device includes a platform 1, upon which a passenger 2 stands while the inspection is being carried out. The passenger 2 thus represents the test object. His longitudinal axis 3 extends in the vertical direction during the monitoring.

In addition, the device includes a frame 4, which is arranged a distance away from the platform 1 and can be pivoted in a circle about the longitudinal axis 3 at a distance from the platform 1 and thus along the circumference of the passenger 2. Fastened into the frame 4 is at least one transmitting and receiving system 5, 6 each having one transmitting antenna and at least one receiving antenna, each of which has a direction of view and reception that is inclined at an angle of 15° to 70°, preferably 20° to 35°, to the longitudinal axis 3 of the test object (passenger 2). Preferably, as is shown in the present example, the lower and upper end regions of the frame 4 each have a transmitting and receiving system 5, 6 located therein.

The transmitting antennas of the lower and upper systems 5, 6 are arranged opposite one another, so that the test object (passenger 2) is illuminated at an angle from below and at an angle from above with millimeter waves having a frequency of 1 GHz to 10 THz, preferably 50 GHz to 200 GHz. In the example embodiment, millimeter waves in a frequency band from 95 GHz to 105 GHz are used for illumination.

In the present example embodiment, the transmitting and receiving systems 5, 6 rotate about the stationary test object (passenger 2) in order to successively illuminate it along its circumference with millimeter waves. Alternatively, it is also possible to have the test object (passenger 2) rotate before a stationary illuminating and receiving device. Then the device includes a stationary frame 4 with at least one transmitting and receiving system and a rotating platform upon which the passenger stands while the inspection is being carried out. Another alternative includes arranging individual transmitting and receiving antennas in an antenna array over the entire circumference of the test object. The individual transmitting and receiving antennas are then activated in an appropriately time-shifted manner to successively illuminate the circumference of the test object and receive corresponding reflected waves.

In addition, the device includes an analysis system (not shown in the drawing) having suitable computing power, which analyzes the received waves scattered by the test object in order to obtain an image of the test object. The images produced are displayed to an operator on suitable display devices.

To perform the inspection, the transmitting and receiving systems 5, 6 are moved in a circle about the test object in a horizontal plane and thus perpendicular to the direction of the longitudinal axis 3. As this occurs, the test object is successively illuminated with millimeter waves along its circumference. As a result of the horizontal motion around the test object, every point on the object's surface is sensed from multiple perspectives. Here, the analysis perpendicular to the direction of the longitudinal axis 3 of the test object is based on the SAR (synthetic aperture) principle. In this context, the perspectives are analyzed together, computationally producing an antenna that is effectively much larger. This method results in an improvement in resolution perpendicular to the longitudinal axis 3 of the test object.

The analysis in the direction of the longitudinal axis 3 of the test object is based on the pulse radar or FMCW radar principle. The use of pulsed or frequency-modulated continuous radiation makes it possible to identify the reflected signal corresponding to every radiated signal. Here, the surface structure is reconstructed from the propagation time difference. Since the illumination diagonally from above and diagonally from below is inclined at an angle of 15° to 70°, preferably 20° to 35°, to the longitudinal axis 3, the greatest possible propagation time differences for adjacent points on the surface of the test object are achieved, thus improving resolution in the direction of the longitudinal axis 3. Preferably transmitting and receiving systems 5, 6 are used in which two receiving antennas spaced a short distance apart from one another are associated with the transmitting antenna in each case. As a result of the use of this additional receiving device with offset antenna for the scattered field, additional information on the distance of the individual image point from the longitudinal axis 3 can be obtained by an interferometric analysis of the scattered field information. In this method, the measured phase difference between the two signals of the two receiving antennas is analyzed in order to uniquely localize the point on the surface that is illuminated at that time.

In advantageous manner, two (as in the example embodiment) or more transmitting and receiving systems 5, 6 are used. In this way, the scattered field information from the individual systems can be computationally combined or superimposed. This also allows for the analysis of scattered signals transported between the individual systems. In this context, a system can be used which covers two or more frequency ranges that are separated significantly from one another and which are considerably larger than the bandwidth. In this regard either common processing with the goal of improved resolution can be performed, or additional imaging information can be obtained through analysis of the difference information. Another possibility includes analyzing difference images with respect to phase and/or amplitude, which are obtained with different polarization components, different frequency ranges and/or different illuminating devices.

If multiple transmitting and receiving systems 5, 6 are used, mutual interference can occur. This interference can be filtered out again by the use of a frequency offset that is present at a particular time. In this connection, it can be advantageous to use a frequency offset between the systems that is significantly larger than the bandwidths of the transmitted radiation in order to obtain different scattered field information.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for imaging at least one test object by millimeter waves, in particular for inspecting individuals for suspicious objects, the method comprising:

illuminating the test object successively with millimeter waves along a circumference of said test object; and receiving and analyzing scattered waves to display an image of the test object, wherein a direction of view of a transmitting antenna and a direction of reception of the receiving antenna are inclined at an angle of 15° to 70° to a longitudinal axis of the test object, and wherein a pulse radar or FMCW radar principle is used to analyze radiation scattered in the direction of the longitudinal axis of the test object and the SAR principle is used for analysis perpendicular to the longitudinal axis.

2. The method according to claim 1, wherein the longitudinal axis of the test object extends vertically, and its successive illumination along the circumference takes place in a horizontal direction.

3. The method according to claim 1, wherein the illuminating device and the arrangement for scattered field sensing are moved around the test object to be imaged.

4. The method according to claim 1, wherein two or more transmitting and receiving systems are used.

5. The method according to claim 4, wherein a frequency offset that is present between the systems at a particular time is used to prevent mutual interference.

6. The method according to claim 1, wherein a transmitting and receiving system is used that covers two or more frequency ranges separated from one another by significantly more than a bandwidth, wherein better resolution is achieved by common processing or additional imaging information is obtained through analysis of the difference information.

7. The method according to claim 1, wherein at least one additional receiving device with an offset antenna for the scattered field is used, and wherein the additional information thus obtained is interferometrically analyzed in order to obtain information on the distance of the individual image point from the longitudinal axis.

8. A device comprising:
- at least one transmitting and receiving system which successively illuminates a test object with millimeter waves along a circumference of said test object and which receives the scattered waves; and
- an analysis system, which produces an image of the test object from the received waves,
- wherein a transmitting antenna and a receiving antenna of each transmitting and receiving system are oriented such that the direction of view of the transmitting antenna and the direction of reception of the receiving antenna are inclined at an angle of 15° to 70° to a longitudinal axis of the test object and wherein a pulse radar or FMCW radar principle is used by the analysis system to analyze radiation scattered in the direction of the longitudinal axis of the test object and the SAR principle is used for analysis perpendicular to the longitudinal axis.

9. The device according to claim 8, wherein two or more transmitting and receiving systems have transmitting antennas arranged at an angle to and opposite one another.

10. The device according to claim 8, wherein the transmitting and receiving system has an additional receiving device with an offset antenna for the scattered field in order to interferometrically analyze the scattered field information.

11. The method according to claim 1, wherein a direction of view of a transmitting antenna and a direction of reception of the receiving antenna are inclined at an angle of 20° to 35° to a longitudinal axis of the test object.

12. The method according to claim 1, wherein the test object is illuminated diagonally from above and diagonally from below.

13. The device according to claim 8, wherein a transmitting antenna and a receiving antenna of each transmitting and receiving system are oriented such that the direction of view of the transmitting antenna and the direction of reception of the receiving antenna are inclined at an angle of 20° to 35° to a longitudinal axis of the test object.

14. The device according to claim 8, further including spaced apart multiple transmitting and receiving antenna which are oriented at an angle toward each other from an upper position and a lower position.

* * * * *